Feb. 10, 1942.  G. LAUBE ET AL  2,272,567
CAMERA FREE HEAD
Filed March 29, 1939   3 Sheets-Sheet 1

INVENTORS.
Grover Laube
Robert C. Stevens.
BY
ATTORNEY.

Feb. 10, 1942.   G. LAUBE ET AL   2,272,567
CAMERA FREE HEAD
Filed March 29, 1939   3 Sheets-Sheet 2

INVENTORS.
Grover Laube
Robert C. Stevens
BY
ATTORNEY.

Feb. 10, 1942. G. LAUBE ET AL 2,272,567
CAMERA FREE HEAD
Filed March 29, 1939 3 Sheets-Sheet 3

INVENTORS.
Grover Laube
Robert C. Stevens
BY
ATTORNEY.

Patented Feb. 10, 1942

2,272,567

UNITED STATES PATENT OFFICE 2,272,567

CAMERA FREE HEAD

Grover Laube and Robert Colby Stevens, Los Angeles, Calif., assignors to Twentieth Century-Fox Film Corporation, Los Angeles, Calif., a corporation of New York Application March 29, 1939, Serial No. 264,773

16 Claims. (Cl. 248—185)

This invention relates to motion picture equipment and deals with a free-head commonly used in this art for supporting a motion picture camera.

The invention to be described hereinafter refers to our copending application, Serial Number 264,772, filed March 29, 1939, entitled Camera free-head.

In the motion picture art, the camera free-head is used to provide the necessary movements for the camera and ordinarily consists of means for mounting a camera upon a support, such as a tripod or a camera carriage, whereby the camera itself may be swung on both a vertical axis and a horizontal axis. To those versed in this art, these two movements are known as "panning" and "tilting". Panning, in this sense, consists in rotating the camera on the vertical axis and tilting consists in rotating it on the horizontal axis. These two movements may be had separately or simultaneously and when combined provide a mounting for a camera that is acceptable for either a motion picture camera or a still camera. In the conventional free-head now employed, wherein these two movements are obtained, the means for permitting and controlling such movements consists of frictional engagement between two members. In use it has been found that friction has many disadvantages for this purpose. One particular disadvantage occurs at the start of a panning or tilting motion when the sudden start of the slipping action between the two friction plates is apt to set up a series of small intermittent releases, resulting in an uneven motion at the start; another disadvantage resides in the unevenness of friction in swinging the camera over a considerable arc, where the frictional resistance may vary in spots and results in introducing further unevenness or jerky movement in panning or tilting. In motion picture photography it is imperative that the start of either a panning or tilting movement be smooth and the movements throughout must be uniform and without any evidence of even slight interruptions or variations. Also, in panning or tilting, a free-head must be capable of adjustment so as to yield movements varying from fast to slow, all of uniform speed. As stated before, it has been found that friction will not yield these requirements and, as a result, we conceived of eliminating friction as far as possible and utilizing hydraulic pressure resistance to resist turning, with means for controlling the hydraulic resistance with precision. Hydraulic resistance of this nature may be incorporated in a free-head so that either or both a panning or tilting motion of any speed may be obtained without introducing sudden variations in speed either at the start or over a long or a short movement. The present invention deals with the tilting movement and the copending application previously mentioned deals with the panning movement.

Briefly stated, the objects of this invention are to provide a camera free-head wherein frictional resistance to tilting is reduced to a minimum and the tilting movement is made against hydraulic resistance; to provide means for variably regulating the hydraulic resistance to control the speed of the tilting movement; to provide a free-head of the above nature which yields the requisite tilting movement controlled throughout by hydraulic resistance; and to provide a free-head embodying hydraulic resistance wherein the structure is so arranged and correlated as to provide a carefully designed construction for manufacturing purposes characterized by sturdiness, durability and workmanlike appearance. Other objects and advantages will become apparent as the description proceeds in conjunction with the drawings, in which:

Briefly stated, the invention amounts to incorporating in a free-head a novel means for utilizing hydraulic resistance to control the turning or "tilting" on the horizontal axis. The same principles of hydraulic resistance may be applied to "panning" or turning on the vertical axis. However, since this movement would involve a separate structure having novelty of itself, this part of the invention is covered by the copending application mentioned hereinbefore.

Referring to drawings 1, 2 and 3, wherein we have shown a free-head embodying our invention, it will be seen that the camera free-head includes a member generally designated A, which is adapted to be mounted upon a tripod or a camera support by the screw threads 11. Rotatably mounted upon the member A in any suitable manner to provide rotation about a vertical axis, or a "panning" movement, is a member B. No detail of this construction is shown, since it may take a variety of forms and for the purpose of this disclosure it may be considered as of the ordinary construction in the conventional free-head now in use. Means are shown and generally designated C for locking the member B to the member A in any one of various positions for aligning the camera. Extending from the member B are two upright standards D and supported in the upper ends of the standards D is a construction generally designated E which embodies our invention.

Figure 1:
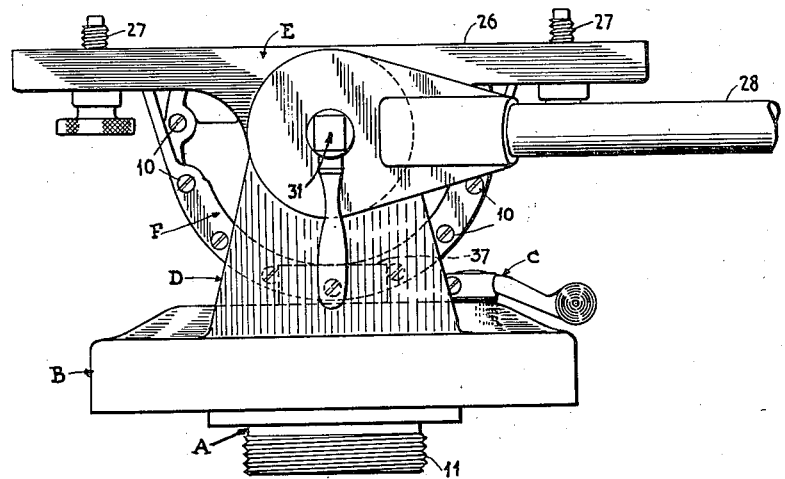
Figure 1 is a side elevation of a camera free-head embodying our invention.
Figure 2:
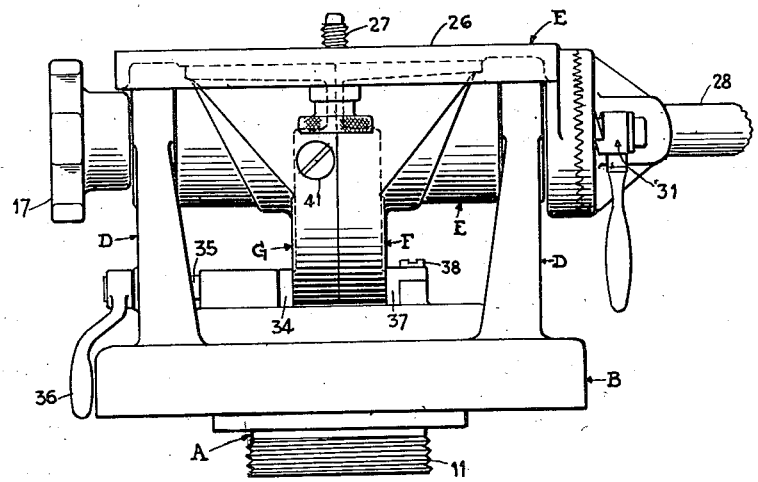
Figure 2 is an end elevation of the same.
Figure 4:
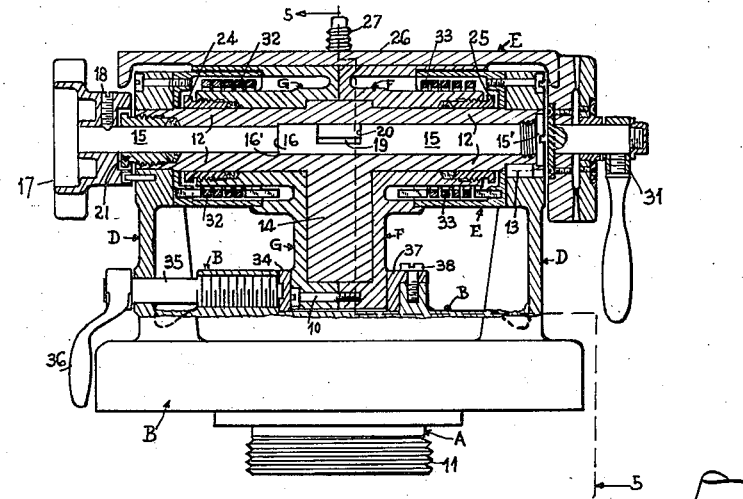
Figure 4 is a view taken on a line 4—4 of Figure 3.
Figure 3:
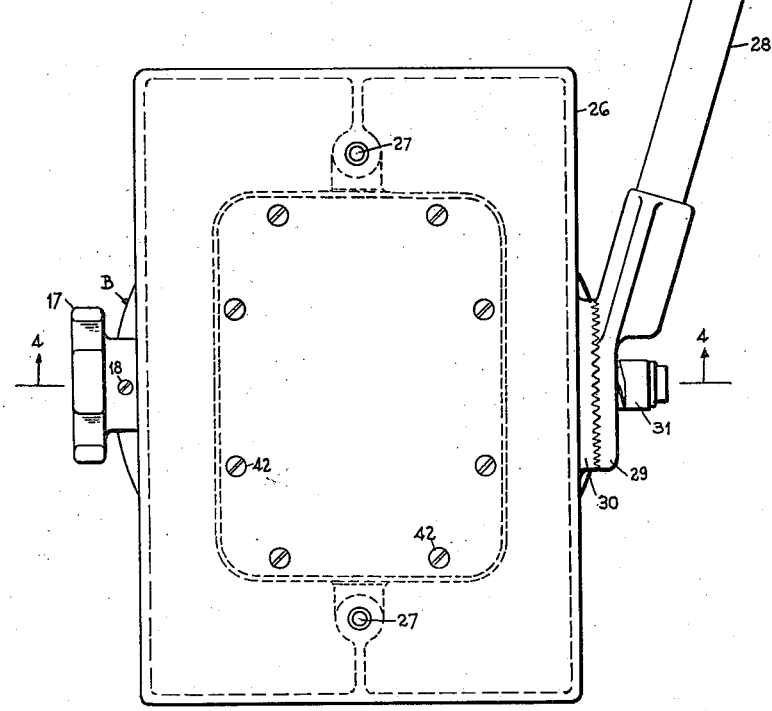
Figure 3 is a top plan view of the same.
Figure 5:
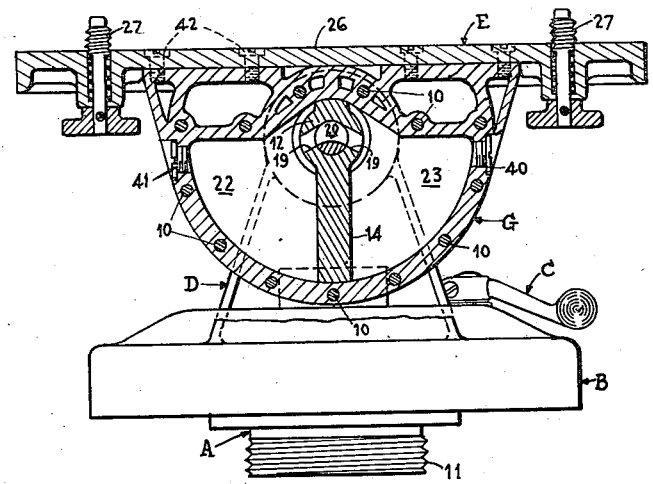
Figure 5 is a view taken on line 5—5 of Figure 3.

In Figures 4 and 5 we have shown the details of the construction of the assembly generally designated E. In detail the assembly E comprises a tubular member 12 supported in the upper ends of the standards D. The member 12 is held against rotation in the standards D by a key 13. In addition the member 12 carries a vane 14 extending at right angles thereto. As shown in Figure 4, the tubular member 12 carries a rod 15 rotatably mounted therein, said rod being reduced at one end to form a shoulder 16 that fits against a shoulder $16^1$ in the member 12. The rod 15 carries an external hand-nut suitably attached thereto by means of a screw 18 for turning the rod relative to the member 12 and the member 12 and the rod 15 carry registering ports 19 and 20 respectively, which are adapted to regulate the port opening through the rod and the member by relative rotation of the rod 15 with respect to the member 12. In order to insure a leak-proof fit around the rod 15, we may provide a packing gland arrangement generally designated 21, and at the opposite end of the rod 15 we provide a nut $15^1$ mounted in the member 12 for holding the rod in place. It will be seen from the foregoing arrangement that the member 12 is stationarily mounted in the supports D, whereas the rod 15 is free to rotate and may be rotated by hand to regulate the size of the opening formed by the ports 19 and 20. The foregoing structure provides the stationary part of the support. The movable part which supports the camera and which is adapted to rotate upon the stationary part comprises two members generally designated F and G. These members are similar in all respects and are arranged to face each other, as shown in Figures 2 and 4, for purposes of manufacturing and assembling. They are held in leak-proof fitting engagement by bolts 10. As will be seen from Figure 4, the members F and G are formed to fit around the tubular member 12 and form a leak-proof sliding fit therearound and also form arcuate chambers 22 and 23 on opposite sides of the vane 14. The passages 19 are formed in the member 12 and are arranged to communicate the chambers 22 and 23 through the port 20. As a means of insuring a leak-proof fit between the member 12 and the members F and G we provide sealing glands generally designated 24 and 25. Mounted upon the members F and G is a plate 26 adapted to support a motion picture camera and for the purpose of attaching the camera to the plate we provide the conventional spring pressed bolts 27. The plate 26 is also equipped with a handlebar 28 adjustably attached to the plate by means of interlocking members 29 and 30 which are released and set by a handle-actuated cam 31. The handlebar construction is conventional in this art and no further description will be entered here. In the ordinary free-head which supports a camera that may weight considerable, it is customary to incorporate compensating or balancing springs to balance the camera in the tilting movement. Various types of construction have been used for this purpose which embody complicated mechanisms. In our invention we have made provision for such spring but have not illustrated them in detail and will accordingly merely show the compensating springs and designate them 32 and 33. There is another element to our invention which comprises a means for locking the free-head in various positions of tilt. In Figure 4 we have shown this means as comprising a block member 34 which is pressed against the side of the member G by means of a screw-threaded bolt 35 mounted in the member B and operated by an external handle 36. The member F similarly engages a fixed member 37 which is mounted upon the member B by means of a screw 38.

The free-head embodied in this invention conforms to the conventional method of operation and provides the two movements necessary in operating a motion picture camera or a still camera. The panning movement is brought about by rotating the free-head upon the vertical axis and, since this disclosure does not deal in particular with the tilting movement, no details of construction have been shown in this respect. The tilting movement is brought about by swinging the camera on the horizontal axis and it is in this movement that we have embodied hydraulic resistance control means. In operating our free-head the chambers 22 and 23 are first filled with a non-compressible liquid, preferably oil. This may be done through plug openings 40 and 41 shown in the member G. The chambers 22 and 23, as before stated, are inter-connected through the passage 19 in the member 12 and the port 20 in the member 16. The port 20 and the passages 19 are arranged to register when the rod 16 is telescoped into the end of the rod 15 as shown in Figure 4. In tilting the camera, the plate 26, upon which the camera rests, as will be seen in Figure 5, is attached to the members F and G by bolts 42 and consequently the members F and G are rotated around the member 12, since the member 12 is keyed to the upright standard D by the key 13. Under this arrangement the vane 14 will be held stationary and the chambers 22 and 23 will accordingly change in volume as the members F and G are rotated. Consequently, the liquid in one chamber must be forced over into the other chamber through the ports 19 and 20 when the camera is tilted. The means for controlling the resistance to flow of liquid from one chamber to the other has been shown and described as comprising the port 20, which is regulated by the hand-nut 17. Accordingly, if a fast tilt is required, the port 20 is left fully open and the liquid is readily moved from one chamber to the other in a tilting movement. If, on the other hand, a slow tilt is required, the port 20 may be partially or nearly closed and a high resistance set up against movement. The result is a smooth, uniform resistance to movement in either direction, which may be regulated to yield a comparatively high resistance or a comparatively low resistance over a long or a short movement without interruption or unevenness in the slightest degree. It will be noted that due to the construction the camera may be swung in a vertical arc sufficiently great to meet all requirements of cinematography and that the complete swing of the camera over the entire arc is controlled by hydraulic resistance.

A noteworthy feature of the device resides in the design and construction of the same. With respect to the assembly E, it is pointed out that this part of the device being built in two sections, namely F and G, lends itself readily to manufacturing practice and ease of assembly and disassembly.

We claim:

1. In a camera free-head, a camera support adapted to swing about a fixed horizontal member, there being an arcuate chamber in said support adapted to swing with the same, a stationary vane on said fixed horizontal member extending into said chamber dividing the same into two communicating compartments and adapted to force liquid from one compartment to the other when said camera support is moved on its horizontal axis.

2. In a camera free-head, a camera support adapted to swing about a horizontal axis, hydraulic means for resisting said swinging movement, said hydraulic means including a liquid filled chamber incorporated in said camera support adapted to swing with the same, a stationary vane extending into said chamber and forming two compartments therein, there being a communicating passage between the two said compartments, and the said vane being arranged to force liquid from one compartment to the other through said passage when the camera support is swung on its axis.

3. The elements of claim 2 and in addition thereto means for controlling resistance to flow of said liquid through said passage.

4. In a camera free-head, a member arranged to revolve in a substantially horizontal plane, said member having two substantially upright standards, a cross member fixedly supported in said standards, a vane extending from said cross member intermediate its ends, said cross member having a passage transversely therethrough near said vane, a camera support rotatably mounted on said cross member, said camera support having an arcuate chamber adapted to enclose said vane and said passage, said vane being arranged to divide said chamber into two compartments and adapted to force liquid from one compartment to the other through said passage when said camera support is swung on its axis.

5. In a camera free-head, a horizontally revolvable member having two substantially upright standards, a tubular member fixedly supported on said standards, said tubular member having a passage transversely therethrough, a rod rotatably mounted internally of said tubular member and having a passage therethrough arranged to register with said passage in said tubular member, a vane extending from said tubular member intermediate its ends, a camera support rotatably mounted on said tubular member, said camera support having an arcuate chamber adapted to enclose said vane and said passages, said vane being arranged to divide said chamber into two compartments and adapted to force liquid from one compartment to the other compartment through said passages when said camera support is swung on its axis, and means for rotating said rod to selectively vary the size of said passage between said compartments.

6. In a camera free-head, a member arranged to revolve in a substantially horizontal plane, said member having two substantially upright standards, a cross member fixedly supported in said standards, a camera support rotatably mounted on said cross member, said camera support having an arcuate chamber extending therebelow, and means on said first mentioned member for engaging said arcuate chamber and holding the same fixed with respect to rotation on said cross member.

7. In a camera free-head, a member arranged to revolve in a substantially horizontal plane, an elevated cross member fixedly supported on said first mentioned member, a vane extending from said cross member intermediate its ends, a camera support rotatably mounted on said cross member, said camera support having an arcuate chamber extending therebelow enclosing said vane and dividing said chamber into two compartments, said vane being adapted to force liquid from one compartment to the other when said camera support is swung on its axis, and means on said first mentioned member for engaging the outer wall of said chamber and holding said camera support fixed with respect to rotation on its axis.

8. For use with a camera, a free-head comprising: a pair of upright supports, a camera supporting member rotatably mounted between said upright supports, and hydraulic means for resisting rotation of said camera supporting member relative to said upright supports.

9. For use with a camera, a free-head comprising: a pair of standards, a cross member fixedly mounted on said standards, a camera supporting member rotatably mounted on said cross member and having an arcuate chamber therein adapted to be filled with liquid, a fixed vane on said cross member extending into said chamber and dividing the same into two compartments, and means for rotating said camera supporting member on said cross member to move said chamber relative to said fixed vane and cause said vane to force liquid from one of said compartments to the other to resist rotation of said camera supporting member.

10. For use with a camera, a free-head comprising: a pair of standards, a cross member fixedly mounted on said standards, a camera supporting member rotatably mounted on said cross member and having an arcuate chamber therein adapted to be filled with liquid, a fixed vane on said cross member extending into said chamber and dividing the same into two compartments, means for rotating said camera supporting member on said cross member to move said chamber relative to said fixed vane and cause said vane to force liquid from one of said compartments to the other to resist rotation of said camera supporting member, and means for setting up an adjustable resistance to flow of liquid from one of said compartments to the other.

11. For use with a camera, a free-head comprising: a pair of standards, a tubular cross member fixedly mounted on said standards, a camera supporting member rotatably mounted on said cross member and having an arcuate chamber therein adapted to be filled with liquid, a fixed vane on said cross member extending into said chamber and dividing the same into two compartments, a rod rotatably mounted in said tubular member, there being ports in said rod and said tubular member arranged to be brought into and out of registration by rotation of said rod relative to said tubular member to control the flow of liquid from one of said compartments to the other upon rotation of said camera supporting member relative to said tubular cross member.

12. For use with a camera, a free-head comprising: a substantially horizontal fixed member, a camera supporting member rotatably mounted on said fixed member, said camera supporting member having an arcuate chamber embodied therein adapted to be filled with liquid, a vane on said fixed member arranged to divide said chamber into two compartments, there being a by-pass around said vane connecting the two said compartments, and adjustable means in said by-pass for regulating the flow of said liquid from one compartment to the other to oppose rotation of said camera supporting member relative to said horizontal fixed member.

13. A camera free-head comprising, a camera supporting member adapted to detachably support a camera, said member having a depending arcuate chamber adapted to be filled with liquid, a substantially horizontal fixed member, means for rotatably mounting said camera supporting member on said fixed member, a fixed vane on said fixed member extending into said chamber, and means for adjustably by-passing said liquid around said vane as said chamber is moved past said vane upon rotation of said camera supporting member on said horizontal fixed member.

14. In a camera free-head, a camera supporting member pivotally mounted on a horizontal fixed member, means for yieldably resisting rotation of said camera supporting member on said fixed member, said means including a stationary vane upon said fixed member adapted to extend into a liquid filled arcuate chamber incorporated in said camera supporting member and divide the same into two compartments, and means for rotating said camera supporting member on said fixed member to move said chamber past said vane to force liquid from one of said compartments to the other.

15. In a camera free-head, a camera supporting member pivotally mounted on a horizontal fixed member, hydraulic means for opposing rotation of said camera supporting member on said fixed member, said means including a liquid filled arcuate chamber embodied in said camera supporting member, a stationary vane on said fixed member adapted to extend into said chamber, and means to by-pass liquid from one side to the other of the vane as said chamber is moved past said vane when said camera supporting member is rotated on said fixed member.

16. In a camera free-head, a pair of standards, a cross member fixedly mounted in said standards, a camera supporting member pivotally mounted on said cross member, said camera supporting member having an arcuate chamber incorporated therewith adapted to be filled with liquid, a vane on said cross member extending into said chamber and dividing the same into two compartments, and means for rotating said camera supporting member on said fixed member to pass said chamber by said fixed vane and force liquid from one of said compartments to the other.

GROVER LAUBE.
ROBERT COLBY STEVENS.